United States Patent [19]
Dornier et al.

[11] Patent Number: 5,561,772
[45] Date of Patent: Oct. 1, 1996

[54] EXPANSION BUS SYSTEM FOR REPLICATING AN INTERNAL BUS AS AN EXTERNAL BUS WITH LOGICAL INTERRUPTS REPLACING PHYSICAL INTERRUPT LINES

[75] Inventors: Pascal Dornier, Sunnyvale; Dan Kikinis, Sratoga; William J. Seiler, Scotts Valley; William S. Jacobs, Santa Cruz, all of Calif.

[73] Assignee: Elonex Technologies, Inc., San Mateo, Calif.

[21] Appl. No.: 280,924

[22] Filed: Jul. 26, 1994

Related U.S. Application Data

[63] Continuation-in-part of Ser. No. 16,122, Feb. 10, 1993, Pat. No. 5,457,785, and a continuation-in-part of Ser. No. 86,719, Jul. 2, 1993, abandoned.

[51] Int. Cl.⁶ .............................. G06F 9/46; G06F 13/24; G06F 13/364
[52] U.S. Cl. .................. 395/281; 364/DIG. 1; 364/DIG. 2; 395/309; 395/307
[58] Field of Search .................. 395/725, 275, 395/550, 800, 375, 700, 739, 309, 402, 281, 410, 292, 325, 133; 364/DIG. 1, DIG. 2

[56] References Cited

U.S. PATENT DOCUMENTS

| | | | |
|---|---|---|---|
| 5,125,093 | 6/1992 | McFarland | 395/725 |
| 5,163,156 | 11/1992 | Leung et al. | 395/800 |
| 5,170,470 | 12/1992 | Pindar et al. | 395/275 |
| 5,261,107 | 11/1993 | Klim et al. | 395/725 |
| 5,261,114 | 11/1993 | Raasch et al. | 395/800 |

*Primary Examiner*—Daniel H. Pan
*Attorney, Agent, or Firm*—Donald R. Boys

[57] ABSTRACT

A compressed I/O bus system for a general-purpose computer multiplexes 32 bit data and addresses on 32 of 42 dedicated parallel signal paths, and optimizes the bus structure by mapping bus requests made by peripheral devices to "high" memory portions of system RAM not dedicated to other purposes. In one aspect a bus controller is programmable to select translation routines stored in system RAM, allowing various models and types of CPUs to be supported. In this aspect, supported CPUs are interchangeable in the system. In another aspect a default interface attaches to the compressed I/O bus of the invention, and translates bus states between the optimized compressed bus and one of an ISA bus or an EISA bus.

12 Claims, 21 Drawing Sheets

Signal Correspondence

```
 0  D0   BE0  ⎫
 1  D1   BE1  ⎪
 2  D2   A2   ⎪
 3  D3   A3   ⎪
 4  D4   A4   ⎪
 5  D5   A5   ⎪
 6  D6   A6   ⎪
 7  D7   A7   ⎪
 8  D8   A8   ⎪
 9  D9   A9   ⎪
10  D10  A10  ⎪
11  D11  A11  ⎪
12  D12  A12  ⎪
13  D13  A13  ⎬  Data 0..31 multiplexed with Address
14  D14  A14  ⎪  2..31 and Byte Enable 0..1
15  D15  A15  ⎪
16  D16  A16  ⎪
17  D17  A17  ⎪
18  D18  A18  ⎪
19  D19  A19  ⎪
20  D20  A20  ⎪
21  D21  A21  ⎪
22  D22  A22  ⎪
23  D23  A23  ⎪
24  D24  A24  ⎪
25  D25  A25  ⎪
26  D26  A26  ⎪
27  D27  A27  ⎪
28  D28  A28  ⎪
29  D29  A29  ⎪
30  D30  A30  ⎪
31  D31  A31  ⎭
32  Byte Enable 2  ⎫
33  Byte Enable 3  ⎪
34  Clk           ⎪
35  ADS           ⎪
36  LDEV #        ⎬  Separate control lines in
37  RDY #         ⎪  addition to 32 D & A
38  R/W #         ⎪
39  BREQ #        ⎪
40  BACK #        ⎪
41  RESET #       ⎭
```

Signal Correspondence

| | | |
|---|---|---|
| 0 | D0 | BE0 |
| 1 | D1 | BE1 |
| 2 | D2 | A2 |
| 3 | D3 | A3 |
| 4 | D4 | A4 |
| 5 | D5 | A5 |
| 6 | D6 | A6 |
| 7 | D7 | A7 |
| 8 | D8 | A8 |
| 9 | D9 | A9 |
| 10 | D10 | A10 |
| 11 | D11 | A11 |
| 12 | D12 | A12 |
| 13 | D13 | A13 |
| 14 | D14 | A14 |
| 15 | D15 | A15 |
| 16 | D16 | A16 |
| 17 | D17 | A17 |
| 18 | D18 | A18 |
| 19 | D19 | A19 |
| 20 | D20 | A20 |
| 21 | D21 | A21 |
| 22 | D22 | A22 |
| 23 | D23 | A23 |
| 24 | D24 | A24 |
| 25 | D25 | A25 |
| 26 | D26 | A26 |
| 27 | D27 | A27 |
| 28 | D28 | A28 |
| 29 | D29 | A29 |
| 30 | D30 | A30 |
| 31 | D31 | A31 |

} Data 0..31 multiplexed with Address 2..31 and Byte Enable 0..1

| | |
|---|---|
| 32 | Byte Enable 2 |
| 33 | Byte Enable 3 |
| 34 | Clk |
| 35 | ADS |
| 36 | LDEV # |
| 37 | RDY # |
| 38 | R/W # |
| 39 | BREQ # |
| 40 | BACK # |
| 41 | RESET # |

} Separate control lines in addition to 32 D & A

Fig. 3

| | |
|---|---|
| FFFF'0000 - FFFF'FFFF | BIOS ROM (RESET VECTOR) |
| FFFE'0000 - FFFE'FFFF | I/O SPACE (64 KB) |
| FFFC'0000 - FFFD'FFFF | INTERRUPT ADDRESSES |
| | FFFC'0000    IRQ0 |
| | FFFC'0004    IRQ1 |
| | FFFC'0008    IRQ2 |
| | .... |
| | FFFC'003C    IRQ15 |
| 0000'0000 - FFFB'FFFF | MEMORY SPACE |

| Bit | Host IRQ # Enabled |
|---|---|
| 0 | |
| 1 | |
| 2 | |
| 3 | |
| 4 | |
| 5 | |
| 6 | |
| 7 | |
| 8 | IRQ 5 |
| 9 | IRQ 6 |
| 10 | IRQ 7 |
| 11 | IRQ 15 |
| 12 | 1 = Clock On;  0 = Clock Off |
| 13 | (Future use to enable IRQ4) |
| 14 | |
| 15 | |

Fig. 14

| PIN # | SPP Signal | EPP Signal | E²P² Signal | Type | E²P² Description |
|---|---|---|---|---|---|
| 1 | STROBE/ | WRITE/ | STROBE/ | O | Negative going half of differential bus strobe pair |
| 2-9 | D(7:0) | AD(7:0) | AD(7:0) | I/O | Address/Data/Status. Bidirectional, byte wide |
| 10 | ACK/ | INTR | INTR | I | Interrupt. Driven active asynchronously by slave on status change |
| 11 | BUSY | WAIT/ | IOCHRDY | I/O | Buffered X-IOCHRDY. Driven active asynchronously by X-ISA device to extend cycle. |
| 12 | PE | USER0 | CY0 | O | Cycle type. Encoded signals from the MASTER select the slave operation which will be executed on the next strobe. |
| 13 | SELECT | USER1 | CY1 | O | |
| 14 | AUTOFD/ | DATASTB/ | CY2 | O | |
| 15 | ERROR/ | USER2 | CY4 | O | |
| 16 | INIT/ | USER3 | STROBE | O | Positive going half of differential bus strobe pair, AD and CY are clocked by this signal. |
| 18-19 | GND | GND | PWR | P | Bidirectional power pins. Host can supply or receive power over these lines. |
| 20-25 | GND | GND | GND | P | Ground |

Fig. 15

| Type | CY lines Hex Value |
|---|---|
| RESET_A | 0 |
| SPP_STATE | 1 |
| PF_START_DELAY | 2 |
| PF_DACK2_ON | 3 |
| PF_IOR_ON | 4 |
| PF_DACK2_OFF | 5 |
| IDLE | 6 |
| ALS | 7 |
| ADDR_HOLD | 8 |
| WRITE_DATAL | 9 |
| WRITE_DATAH | A |
| IOW_ON | B |
| IOW_DWELL | C |
| IOW_CMD_OFF | D |
| IOR_ON | E |
| IOR_DWELL | F |
| READ_DATAL | 10 |
| READ_DATAH | 11 |
| IOR_CMD_OFF | 12 |
| READ_STATUS | 13 |
| STATUS_TURNAROUND | 14 |
| WRITE_STATUS-IMAGE | 15 |
| WAIT_CMD_END | 16 |
| DACK2_ON | 17 |
| TC_ON | 18 |
| unused | 19 |
| RESET_B | 1A |
| RESET_C | 1B |
| ATTN_SETTLE | 1C |
| unused | 1D |
| DACK_TC_ON | 1E |
| unused | 1F |

Fig. 16

| DEVICE | ISA I/O ADDRESS | E²P² ADDRESS | DATA WIDTH |
|---|---|---|---|
| NET0 | 300-31F | 00-1F | Configurable |
| OPT0 | 220-227 | 20-27 | Configurable |
| OPT1 | 228-22F | 28-2F | Configurable |
| NET1 | 340-35F | 40-5F | Configurable |
| SHD | 170 | 60 | 16 Bit |
| SHD | 171-177 | 61-67 | 8 Bit |
| SFDC/SHD | 370-377 | 70-77 | 8 Bit |
| LPT1/EPP | 378-37F | 78-7F | 8 Bit |
| PFDC/PHD | 3F0-3F7 | F0-F7 | 8 Bit |

Fig. 17

| Pin | Signal | I/O TYPE | Input | Output | Tri-State | Pull Up |
|---|---|---|---|---|---|---|
| 1 | IOW/ | I | ILST | | | |
| 2 | DACK2/ | I | I | IST | | |
| 3 | TC | I | IST | | | |
| 4 | RESET | I | IST | | | |
| 5 | CLK | I | ILST | | | |
| 6 | GND | GND | | | | |
| 7 | DRQ2 | O | | | OS16/4 | |
| 8 | IRQ15 | O | | | OS16/4 | |
| 9 | IRQ7 | O | | | OS16/4 | |
| 10 | IRQ3 | O | | | OS16/4 | |
| 11 | IRQ6 | O | | | OS16/4 | |
| 12 | VCC | PWR | | | | |
| 13 | IRQ5 | O | | | OS16/4 | |
| 14 | IOCHRDY | O | | | | OS16/4 |
| 15 | GND | GND | | | | |
| 16 | IOCS16/ | O | | | | OS16/4 |
| 17 | SD0 | I/O | IST | | OS16/4 | |
| 18 | SD1 | I/O | IST | | OS16/4 | |
| 19 | SD2 | I/O | IST | | OS16/4 | |
| 20 | SD3 | I/O | IST | | OS16/4 | |
| 21 | GND | GND | | | | |
| 22 | SD4 | I/O | IST | | OS16/4 | |
| 23 | SD5 | I/O | IST | | OS16/4 | |
| 24 | SD6 | I/O | IST | | OS16/4 | |
| 25 | SD7 | I/O | IST | | OS16/4 | |
| 26 | GND | GND | | | | |
| 27 | SD8 | I/O | IST | | OS16/4 | |
| 28 | SD9 | I/O | IST | | OS16/4 | |
| 29 | SD10 | I/O | IST | | OS16/4 | |
| 30 | SD11 | I/O | IST | | OS16/4 | |
| 31 | GND | GND | | | | |
| 32 | SD12 | I/O | IST | | OS16/4 | |
| 33 | SD13 | I/O | IST | | OS16/4 | |
| 34 | SD14 | I/O | IST | | OS16/4 | |
| 35 | SD15 | I/O | IST | | OS16/4 | |
| 36 | VCC | PWR | | | | |
| 37 | GND | GND | | | | |
| 38 | PS3 | I/O | ILST | | OS24 | |
| 39 | PS2 | I/O | ILST | | OS24 | |
| 40 | GND | GND | | | | |

Fig. 18

| Pin | Signal | I/O TYPE | Input | Output | Tri-State | Pull Up |
|---|---|---|---|---|---|---|
| 41 | GND | | ILST | | | |
| 42 | n/c | I | ILST | IST | | IPU1 |
| 43 | PS1 | I | ILST | | | IPD1 |
| 44 | PS0 | I/O | | | OS24/12 | |
| 45 | AD7 | PWR | | | | |
| 46 | VCC | GND | ILST | | | |
| 47 | GND | I/O | ILST | | OS24/12 | |
| 48 | AD6 | I/O | | | OS24/12 | |
| 49 | AD5 | GND | ILST | | | |
| 50 | GND | I/O | ILST | | OS24/12 | |
| 51 | AD4 | I/O | | | OS24/12 | |
| 52 | AD3 | GND | | | | |
| 53 | GND | O | IST | | OS24/12 | |
| 54 | PC3 | I/O | | | OS24/12 | |
| 55 | AD2 | PWR | | | | |
| 56 | VCC | GND | | | | |
| 57 | GND | O | IST | | OS24/12 | |
| 58 | PC2 | I/O | | | OS24/12 | |
| 59 | AD1 | GND | IST | | | |
| 60 | GND | I/O | IST | | OS24/12 | |
| 61 | PS4 | I/O | | | OS24/12 | |
| 62 | AD0 | GND | | | | |
| 63 | GND'PC1 | O | | | OS24/12 | |
| 64 | PC0 | O | | | OS24/12 | |
| 65 | GND | GND | IST | | | |
| 66 | SA0 | I | IST | | | |
| 67 | SA1 | I | IST | | | |
| 68 | SA2 | I | IST | | | |
| 69 | SA3 | I | IST | | | |
| 70 | SA4 | I | IST | | | |
| 71 | SA5 | I | | | | |
| 72 | VCC | PWR | IST | | | |
| 73 | SA6 | I | | | | |
| 74 | GND | GND | IST | | | |
| 75 | SA7 | I | IST | | | |
| 76 | SA8 | I | IST | | | |
| 77 | SA9 | I | IST | | | |
| 78 | AEN | I | IST | | | |
| 79 | CS/ | I | IST | | | |
| 80 | IOR/ | I | | | | |

Fig. 19

| Pin | Signal | I/O TYPE | Input | Output | Tri-State | Pull Up |
|---|---|---|---|---|---|---|
| 1 | IOW/ | O | | OB16/4 | | |
| 2 | DACK2/ | O | | OB16/4 | | |
| 3 | TC | O | | OB16/4 | | |
| 4 | RSTDRV | O | | OB16/4 | | |
| 5 | STB | I | IST | | | |
| 6 | GND | ND | | | | |
| 7 | DRQ2 | I | uIST | | | IPU1 |
| 8 | IRQ15 | I | uIST | | | IPU1 |
| 9 | IRQ7 | I | uIST | | | IPU1 |
| 10 | IRQ3 | I | uIST | | | IPU1 |
| 11 | IRQ6 | I | uIST | | | IPU1 |
| 12 | VCC | PWR | | | | |
| 13 | IRQ5 | I | uIST | | | IPU1 |
| 14 | IOCHRDY | I | uIST | | | |
| 15 | GND | GND | | | | IPU1 |
| 16 | N/C | | | | | |
| 17 | SD0 | I/O | uIST | | OS16/4 | |
| 18 | SD1 | I/O | uIST | | OS16/4 | |
| 19 | SD2 | I/O | uIST | | OS16/4 | |
| 20 | SD3 | I/O | uIST | | OS16/4 | |
| 21 | GND | GND | | | | |
| 22 | SD4 | I/O | uIST | | OS16/4 | |
| 23 | SD5 | I/O | uIST | | OS16/4 | |
| 24 | SD6 | I/O | uIST | | OS16/4 | |
| 25 | SD7 | I/O | uIST | | OS16/4 | |
| 26 | GND | GND | | | | |
| 27 | SD8 | I/O | uIST | | OS16/4 | |
| 28 | SD9 | I/O | uIST | | OS16/4 | |
| 29 | SD10 | I/O | uIST | | OS16/4 | |
| 30 | SD11 | I/O | uIST | | OS16/4 | |
| 31 | GND | GND | | | | |
| 32 | SD12 | I/O | uIST | | OS16/4 | |
| 33 | SD13 | I/O | uIST | | OS16/4 | |
| 34 | SD14 | I/O | uIST | | OS16/4 | |
| 35 | SD15 | I/O | uIST | | OS16/4 | |
| 36 | VCC | PWR | | | | |
| 37 | GND | GND | | | | |
| 38 | PWRON_RST | I | uIST | | | IPU1 |
| 39 | N/C | | | | | |
| 40 | GND | GND | | | | |

Fig. 20

| Pin | Signal | I/O TYPE | Input | Output | Tri-State | Pull Up |
|---|---|---|---|---|---|---|
| 41 | N/C | | | | | |
| 42 | PS1 | O | | OB24/12 | | |
| 43 | PS0 | O | | OB24/12 | | |
| 44 | AD7 | I/O | uIST | | OS24/12 | |
| 45 | VCC | PWR | | | | |
| 46 | GND | GND | | | | |
| 47 | AD6 | I/O | uIST | | OS24/12 | |
| 48 | AD5 | I/O | uIST | | OS24/12 | |
| 49 | GND | GND | | | | |
| 50 | AD4 | I/O | uIST | | OS24/12 | |
| 51 | AD3 | I/O | uIST | | OS24/12 | |
| 52 | GND | GND | | | | |
| 53 | PC3 | I | uIST | | | |
| 54 | AD2 | I/O | uIST | | OS24/12 | |
| 55 | VCC | PWR | | | | |
| 56 | GND | GND | | | | |
| 57 | PC2 | I | uIST | | | |
| 58 | AD1 | I/O | uIST | | OS24/12 | |
| 59 | GND | GND | | | | |
| 60 | PS4 | I | uIST | | | |
| 61 | AD0 | I/O | uIST | | OS24/12 | |
| 62 | GND | GND | | | | |
| 63 | PC1 | I | uIST | | | |
| 64 | PC0 | I | uIST | | | |
| 65 | GND | GND | | | | |
| 66 | SA0 | O | | OB16/4 | | |
| 67 | SA1 | O | | OB16/4 | | |
| 68 | SA2 | O | | OB16/4 | | |
| 69 | SA3 | O | | OB16/4 | | |
| 70 | SA4 | O | | OB16/4 | | |
| 71 | SA5 | O | | OB16/4 | | |
| 72 | VCC | PWR | | | | |
| 73 | SA6 | O | | OB16/4 | | |
| 74 | GND | GND | | | | |
| 75 | SA7 | O | | OB16/4 | | |
| 76 | SA8 | O | | OB16/4 | | |
| 77 | SA9 | O | | OB16/4 | | |
| 78 | AEN | O | | OB16/4 | | |
| 79 | N/C | | | | | |
| 80 | IOR/ | O | | OB16/4 | | |

Fig. 21

EXPANSION BUS SYSTEM FOR REPLICATING AN INTERNAL BUS AS AN EXTERNAL BUS WITH LOGICAL INTERRUPTS REPLACING PHYSICAL INTERRUPT LINES

CROSS-REFERENCE TO RELATED DOCUMENTS

This application is a Continuation-in-Part of prior patent application Ser. Nos. 08/016,122, filed Feb. 10, 1993, now U.S. Pat. No. 5,457,785, and of 08/086,719 filed Jul. 2, 1993, now abandoned.

FIELD OF THE INVENTION

The present invent relates generally to computers, and more specifically to a bus system for interconnecting the central processing unit other integrated circuits in a general-purpose computer or between computers and peripheral devices.

BACKGROUND OF THE INVENTION

In the about two decades since their introduction, desktop computers have become commonplace. There are now more than 80 million top computers of different types in use around the world. IBM-compatibles and Apple Macintoshes, which are used for business applications, comprise about 90% of the machine sold today. These are collectively known as personal computers, but IBM compatibles are usually called PCs, while Apples are called Macs. The remaining 10% of the market is occupied by higher powered and more expensive machines, generally called engineering "workstations", from Sun Microsystems, Hewlett Packard, Silicon Graphics, Digital Corporation (DEC), etc.

The Macs and the types of workstations are proprietary systems that each made by a single manufacturer. However, PCs have an open architecture. This made possible the entry of a large number of different manufacturers, which lead to the explosive growth of the PC market. However, this with in the business of developing and selling PCs and peripherals has brought about an extreme level of com. Because of the very large number of competitors the high degree of similarity between competing products, the market has become cost driven. Many computer consumers buy the lowest cost machine in a given central processing unit (CPU) class, with little or no brand preference. Consequently, all vendors must compete vigorously on price. The price/performance ratio has become the most important factor in the PC market.

The main component of a typical PC is the motherboard (MB), or a large circuit board that holds the CPU, such as an Intel 80486, random access memory (RAM), control chips, and buffer chips. Expansion slots, which are elongated electrical connectors, on the MB accept peripheral devices such as video controller boards or cards, I/O cards, hard/floppy drive controller cards, network adapters, modems, and so forth. These cards usually control other devices such as monitors, hard and floppy drives, scanners, and more.

A bus structure handles the communication between the separate chips and peripherals. This bus structure includes individual conductive traces (signal paths) on the circuit boards that link the individual components, control chips for controlling the transfer of the signals, and connectors for plugging in the various expansion cards on the MB. The present invention relates closely to such bus structures or architectures.

Early digital computers manipulated 4-bit binary information, or words with a length of 4 decimal places. This communicated a maximum quantity of data of up to 16D, where the D simply indicates a base-ten decimal number. These gave way to more powerful machines with 8-bit communication capability. Today 32-bit data transfer is common. Longer word lengths allow more words or data to be manipulated, and increase the data transfer rate between the various components within a computer.

The word length of the binary code also strongly indicates the bus width, or the number of signal paths on the bus. In most PCs, each bit of information requires a separate signal path for its transfer within the machine. For example, in a computer capable of addressing memory with 32-bit addresses and transferring data with 32-bit word lengths, 64 traces are needed for the address bus and the data bus alone, because the two are usually kept separate. However, many additional paths are needed for other functions, such as I/O cycles, interrupt requests (IRQs), etc.

The number of pins on the IC (integrated circuit) packages that connect to the bus is directly related to the bus width. For example, if there are to be 64 paths for the address bus and the data bus, then every IC that communicates with the bus must have 64 pins to connect to just that part of the bus structure. However, most machines have more than 64 paths in the bus and more than 64 pins in the ICs. For example, the IBM-compatible ISA (Industry Standard Architecture) bus has 96 signals, each with a dedicated trace. The large number of traces makes the layouts on the MB and peripherals very complicated and expensive. Among the 96 signals, at least 80 are typically active simultaneously, each requiring a current of 24 milliamps (ma), and switching at a speed of about 8 MHz. This amounts to a high frequency loading of 1.6 amps, which causes heat buildup and radio frequency interference (RFI) of concern to the Federal Communications Commission.

As the clock speeds of PCs increase, the physical length of the signal paths has become another important consideration in bus design. Longer paths can cause longer delays, because signals propagate through the paths at finite speeds. Delays on the order of nanoseconds can have significant impact in the performance of high frequency machines.

Another important consideration in computer design is compatibility. The vast majority of new PC hardware must work with the installed base of existing hardware and software, otherwise the new machines and devices will not gain acceptance in the market place. Therefore, hardware manufacturers expend a great deal of effort to ensure that their new and advanced, products remain compatible with most existing equipment.

In some general-purpose computer architectures, such as DEC's Turbochannel bus used in powerful workstations, the address and data buses are combined into a single bus. The address and data signals are multiplexed, or alternated, so that they can both be carried on the same group of 32 signal paths. Many benefits accrue as a result of multiplexing the address and data buses. For example, the pin numbers on ICs and motherboard layout congestion are greatly reduced. The reduced congestion allows shorter signal paths, so that signal delays are also reduced. The reduction in the size and complexity of many components provide cost savings. However, multiplexed bus architectures have so far been limited typically to workstations.

Power consumption, pin count, complexity, path length and so forth, have critical application in portable computers, such as notebook and laptop computers. What is needed, especially to advance to power, useful life, and cost issues for such computers is bus system and structure that radically reduces pin count, power consumption, complexity, and buffer requirements.

SUMMARY OF THE INVENTION

An optimized computer bus system for digital communication between a CPU and I/O devices is provided, comprising signal path means having parallel electrical conductors for carrying signals to and from the I/O devices, bus control means connected to the signal path means for communicating with the CPU and for sending and receiving signals on the signal path means. There is also random access memory means connected to the bus control means for storing digital information. The bus control means comprises an interrupt control means for mapping interrupt requests from the I/O devices to the random access memory means for communicating to the CPU.

The optimized computer bus in one aspect has an interface device for coupling the optimized bus to an industry standard bus such as an ISA bus or an EISA bus.

In another aspect a general-purpose computer is provided having an optimized I/O bus according to the above description. In this aspect the CPU for the computer is coupled to a bus controller and a data buffer by local 32-bit-width data and address buses, and system RAM is connected to both the controller and the data buffer. In this aspect, the optimized I/O bus is limited to 42 parallel signal paths, 32 of which are dedicated to multiplexed address and 32-bit data words.

Power consumption, pin count, complexity, and path length are optimized by the invention, providing a bus and associated computer architecture particularly suited to portable computers such as notebook, laptop, and palmtop computers. The optimized bus structure radically reduces pin count, power consumption, complexity, and buffer requirements.

BRIEF DESCRIPTION OF THE DRAWINGS

FIG. 3 is a pin-out listing of the optimized bus structure of the invention in a preferred embodiment.

FIG. 14 is a table of bit assignments for the Interrupt Enable Register for the PIO port of FIG. 11.

FIG. 15 is a table of cable pin and register bit assignments for each of 3 operating modes for the PIO port of FIG. 11.

FIG. 16 is a table of state descriptions for the PIO port of FIG. 11.

FIG. 17 is a table of internal to external device I/O address translations and data sizes.

FIG. 18 is a pinout listing for pins 1–40 of a master state-translation and control device according to the invention.

FIG. 19 is a pinout listing of pins 41–80 for the master device of FIG. 18.

FIG. 20 is a pinout listing for pins 1–40 of a slave state-translation device according to the invention.

FIG. 21 is a pinout listing for pins 41–80 of the slave device of FIG. 20.

DESCRIPTION OF THE PREFERRED EMBODIMENTS

Figure 1:
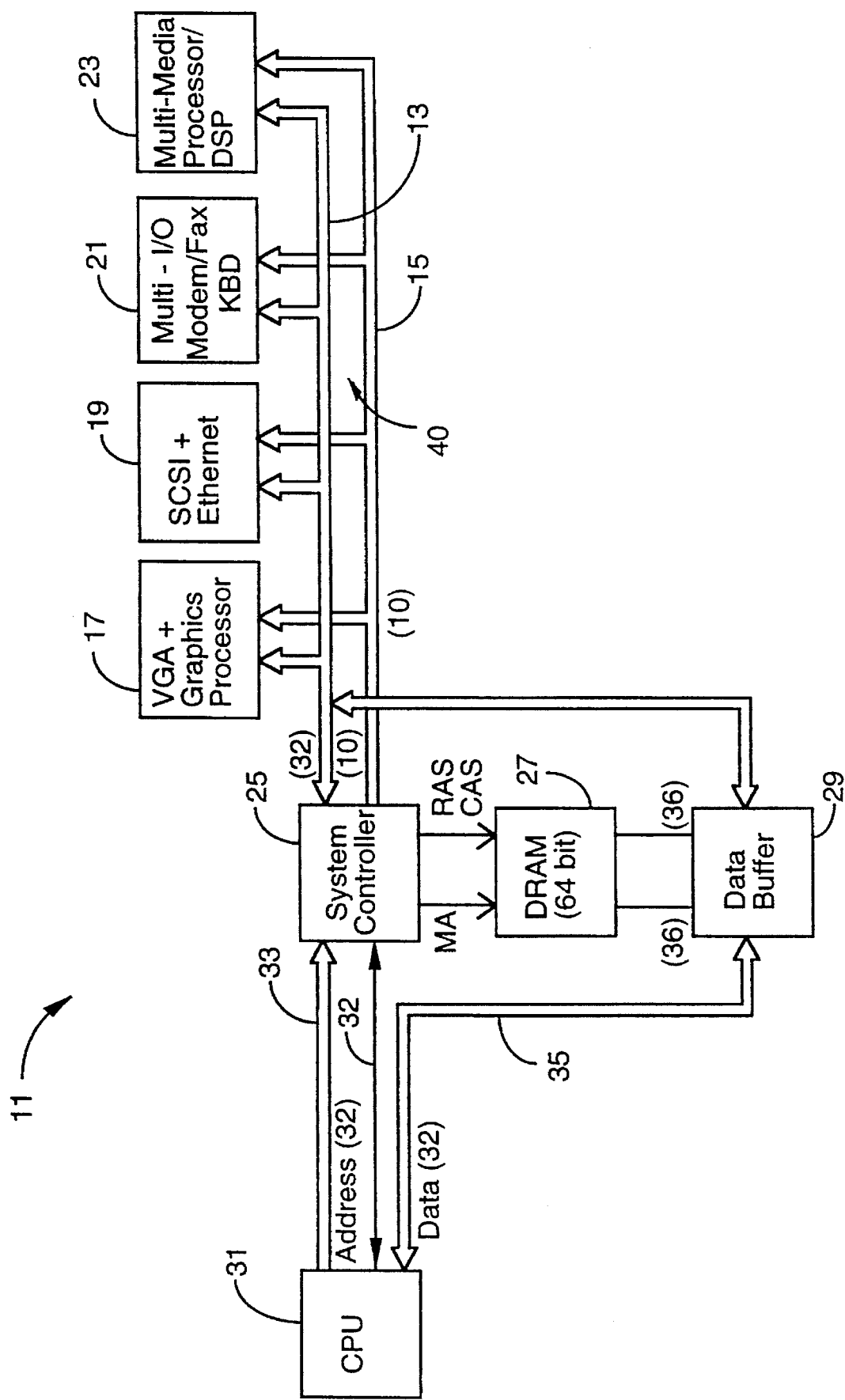
FIG. 1 is a block diagram illustrating a computer architecture according to one embodiment of the invention.

FIG. 1 is a block diagram of a computer architecture 11 according to the present invention. Paths 13 and 15 together represent an optimized High-Speed CPU Interconnect Bus called the HCI Bus by the inventors. The computer architecture based on the HCI bus is hereinafter the HCI architecture. It can be applied to PCs, Macs, workstations, as well as other types, of computers, and is especially useful for portable computers such as notebook and palmtop computers.

Path 13 has 32 traces, and represent a multiplexed, address-and-data combination bus capable of conveying both 32 bit addresses and 32 bit data words. Path 15 has 10 traces for control signals further detailed below. The two paths together comprise the HCI Bus 40, a total of 42 traces, a considerably smaller number than most conventional bus structures, even multiplexed bus structures. The reduction in the number of traces results in a reduction in layout congestion, with a consequent reduction in the length of the traces. The shortened traces in turn reduce signal delays, so that the computer's performance is increased.

Peripheral I/O or expansion devices for the HCI computer architecture are represented by devices 17, 19, 21, and 23. They are shown coupled to HCI bus 40, preferably through expansion slots or connectors (not shown). VGA and Graphics processor card 17 includes high-speed video memory, and is responsible for displaying information on a connected monitor. SCSI and Ethernet interface card 19 provides coupling to various SCSI equipment, such as CD-ROM drives and tape backups, and to Ethernet local area networks. Multi-I/O card 21 is an interface for hard disks, floppy drives, fax/modems, keyboards, etc. Multi-media processor/DSP (digital/signal processor) card 23 is a high-speed I/O and processor for audio and video signals, and can typically drive external speakers or audio amplifiers. Many other types of peripheral devices can be connected to HCI bus 40. Similar devices are widely available for most existing computer architectures. Suitable and relatively simple modifications can be made to make them compatible with the HCI Bus. The reduced number of traces in the HCI Bus in turn allow a reduction in the number of traces and connection contact pads on the peripheral devices.

Other than the peripheral interfaces, the basic computer in the HCI architecture is implemented in just four ICs. A system control chip 25 controls the bus, and contains the system clock (not shown). System memory 27 is high-speed, low-power, dynamic random access memory (DRAM). It communicates with the system controller through multiplexed addressing (MA) of standard rows address signals (RAS) and column address signals (CAS). 64-bit memory is used for better performance, although 32-bit memory can also be used. Data buffer 29 is the only buffer required in the system, because the bus can be driven by low power CMOS (complimentary metal-oxide semiconductor) outputs.

As an example specific to the buffer requirement, the conventional ISA bus is designed to support a TTL definition that is over a decade old. It requires a driving current of 24 ma multiplied by about 80 active signals, which amounts to about 1.6 amps, as described above. This large load requires, in most implementations, as many as twenty small buffer chips, or four or five large ones. The overhead incurred in terms of bus length, heat, RFI, complexity, and so forth, is enormous. In contrast, the HCI architecture has virtually no DC loading and operates at about 10 milliamps per trace, multiplied by about 42 active traces switching at the same speed as most CPUs, or 16 to 33 MHz. As a result, only a single buffer is required in the HCI bus.

Computation in the HCI architecture, as in others, is handled by a CPU 31. The CPU is coupled to system controller 25 by a short 32-bit address bus 33, and to data buffer 29 by a short 32-bit data bus 35. Data is transferred between buffer 29 and DRAM 27 through short but separate address and data buses. Each of these buses has 36 signal paths, 32 of which are for address or data, and 4 are for control.

A significant feature of the HCI architecture is that it may be configured to support a large number of CPUs. Multiplexed buses have been designed in the past, such as the DEC TurboChannel, but these designs are compatible with only a single type of CPU or a single class of CPUs made by a particular manufacturer. In the HCI architecture, the CPU can be virtually any of the many available high-end microprocessors, such as the Intel 80486 and Pentium, DEC Alpha, Motorola 680x0, Sun SPARCs, and many others.

This important advantage of multi-CPU compatibility, or CPU independence, is provided by system controller 25. This chip has a programmable state machine for translating between the state dynamics of a variety of supported CPUs and the state dynamics of the HCI Bus. The programming can be done in a variety of ways, including EPROM, mask, RAM, etc. Even auto-programming can be achieved. In the case of auto-programming, the system controller will automatically recognize the CPU by reading the state, either pull-up or pull-down, of the CPU's output lines. The pattern of these outputs is compared to a database of the patterns of known CPUs until a match is found. The system controller will then use the proper protocols to translate between the CPU and the HCI bus architecture.

In different embodiments of the invention, different types of programmability will be preferable. For example, on a MB designed to work with a variety of CIDUs, an auto-programmable system controller will be preferred. In most cases, the HCI architecture will be designed to work with a single type of CPU, so that it is not necessary to change the setting. In these cases, mask programming is most cost effective.

Another feature of the HCI architecture is support for a high-speed master mode, programmed at the system controller chip. Each type of processor has its own algorithm for burst data transmission. In setting up the generic system controller to be compatible with a particular CPU, the system controller's master mode is set to be initiated and operated by the burst algorithm of the processor used.

Data transfer mechanisms of the architecture are CPU write to HCI, CPU read from HCI, HCI write to main memory, and HCI read from main memory.

Figure 2:
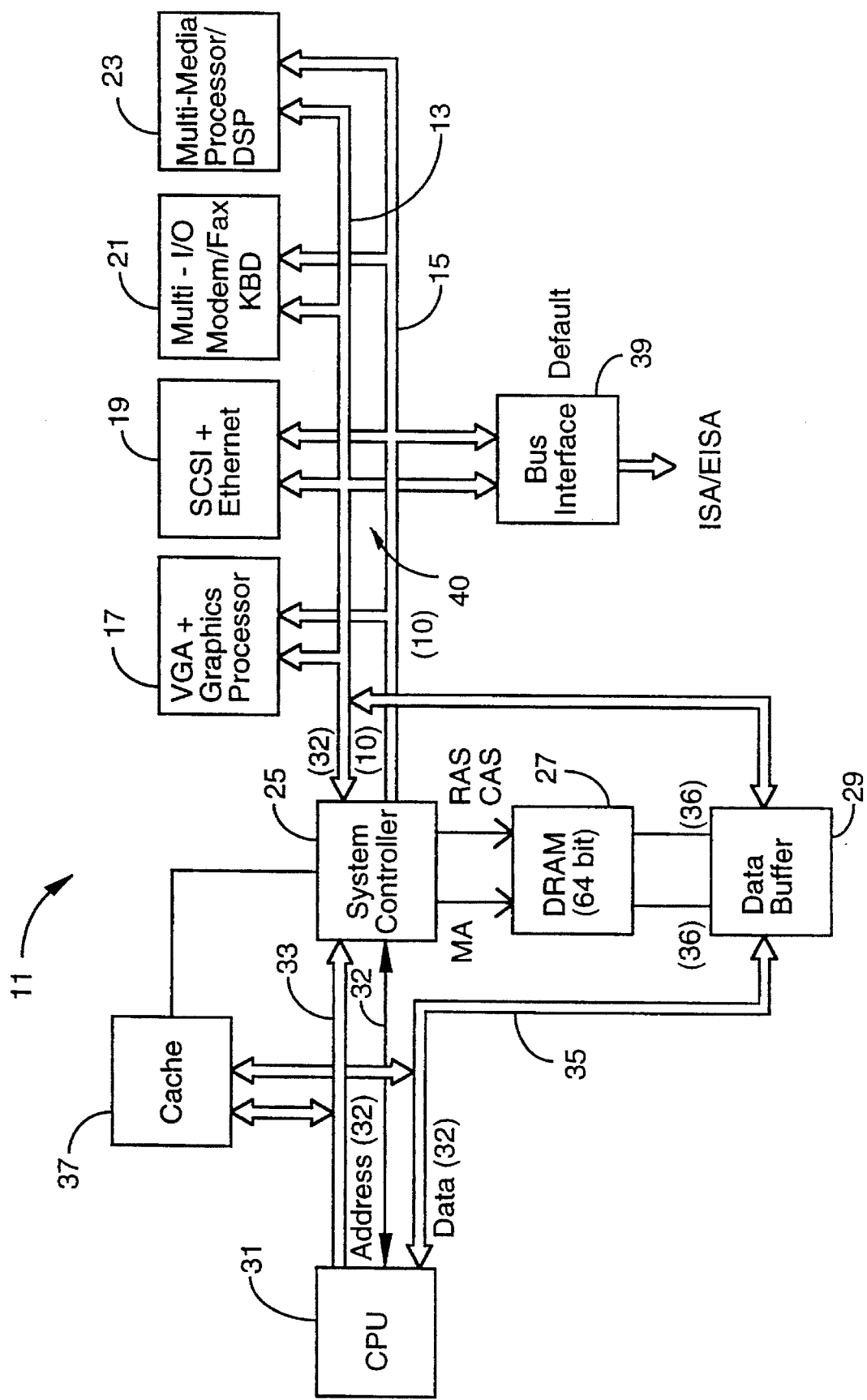
FIG. 2 is a block diagram illustrating a computer architecture as shown in FIG. 1, comprising also an optional interface and cache system.

FIG. 2 shows an alternative embodiment of the HCI architecture, comprising the architecture of FIG. 1 with additional, optional components. To increase performance, high-speed cache memory 37 can be coupled to the address and data buses from the CPU. It is controlled by the system controller. The cache need not be specifically designed to be compatible with HCI state dynamics, because it couples to the CPU bus instead of the HCI Bus.

Another option is a bus interface 39 for coupling the HCI bus to other bus structures, such as ISA, EISA, Microchannel, etc. The bus interface comprises an IC designed to convert between the state dynamics of the HCI bus and the dynamics of the bus to which the HCI bus is to be coupled. For example, when a device on an ISA bus issues an interrupt, the devices on the HCI bus will not answer. In this case, bus interface 39 will become the default device which answers the interrupt.

FIG. 3 is a listing of the signals for the 42 lines of the HCI bus in the present embodiment. The pin numbers 0–41 in the left column are for reference only, and do not imply that the signals could not be in another order. The pins are used as follows:

| | |
|---|---|
| Data0 . . . 31 | are multiplexed with address2 . . . 31 & BE0 . . . 1 |
| BE2 . . . 3 | are remaining byte enables. |
| CLK | Bus clock. |
| ADS | Address strobe. This is used to start a cycle, and to indicate the burst length. ADS is low for one cycle for single word transfers. For burst transfers, it will remain low until the ready before the last word. |
| LDEV# | Device decode. This is used to indicate that a device is claiming a cycle. If no device pulls this line, the cycle will go to the default device, such as ISA bus interface 39. This signal is necessary for zero wait-state write support. |
| RDY# | Ready. Low indicates that valid read data is on the bus, or that a write word has been accepted. |
| R/W# | Read/Write. This is driven simultaneously with the address. |
| BREQ# | Bus request. A bus-mastering peripheral pulls low to request bus ownership. It is specific to each device. |
| BACK# | Bus acknowledge or grant. Goes low when |

| | bus ownership is granted. It is specific to each device. |
|---|---|
| RESET# | Low = system reset. |

In conventional bus structures, in addition to the address, data, and control lines, many additional paths are needed for I/O and interrupt signals. An interrupt controller IC reads the IRQ signals, then triggers an interrupt in the CPU. This is a significant source of layout congestion in such architectures.

Figures 4A, 4B:
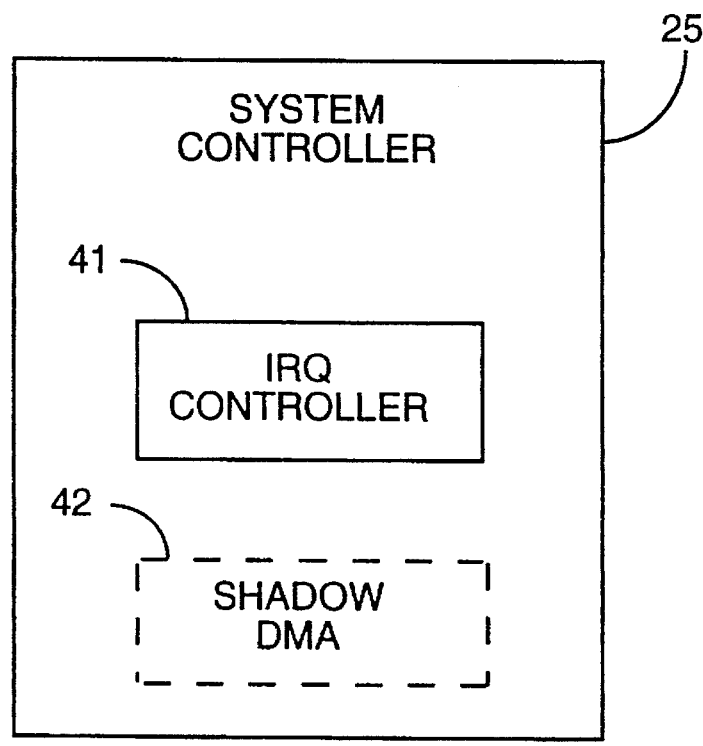
FIG. 4A illustrates a memory mapping scheme for a general-purpose computer according to an embodiment of the present invention.
FIG. 4B illustrates a bus controller incorporating an IRQ controller and a shadow DMA controller according to an embodiment of the invention.

In the HCI bus, instead of issuing interrupts on dedicated paths, IRQs are mapped into high memory, as shown for example in the memory map in FIG. 4A. In this case, bus-mastering peripherals will first take control of the bus, then make master-mode memory writes to a predetermined block of addresses set aside for interrupts. Each interrupt, for example, from IRQ0 to IRQ15, is assigned a particular address. Also instead of using a separate IC for controlling interrupts, an interrupt controller 41 is built into system controller 25. The IRQ controller monitors the address space to trigger the appropriate interrupts. As a result, many paths and pins are saved.

Similarly, instead of communicating I/O on a dedicated path, it is also mapped into high memory. A small space, such as the 64K block from FFFE ' 0000 to FFFE ' FFFF, is set aside for I/O cycles. The mapping of I/O to high memory saves an additional one pin. The Intel CPU architecture has a separate I/O address space that can be accessed only by special instruction, such as IN, OUT, INS, and OUTS. This mapping will allow HCI-compatible devices to be used with other CPUs that do not have a separate I/O space.

Direct memory access (DMA) is not supported in the HCI bus. However, a "shadow" DMA controller 42 can be implemented by using just registers in the system controller to mimic an actual DMA controller.

The calculated performance of the HCI bus is as follows: Maximum burst rate is 132 MBytes/sec at 33 MHz, if the memory system supports one cycle per word burst. HCI master write is accomplished in a minimum of 2 cycles. HCI master read is accomplished in a minimum of 3 cycles (or 4 cycles back-to-back). CPU write is a minimum 2 cycles (or 3 cycles back-to-back). CPU read is a minimum 3 cycles (or 4 cycles back-to-back).

Figure 5:
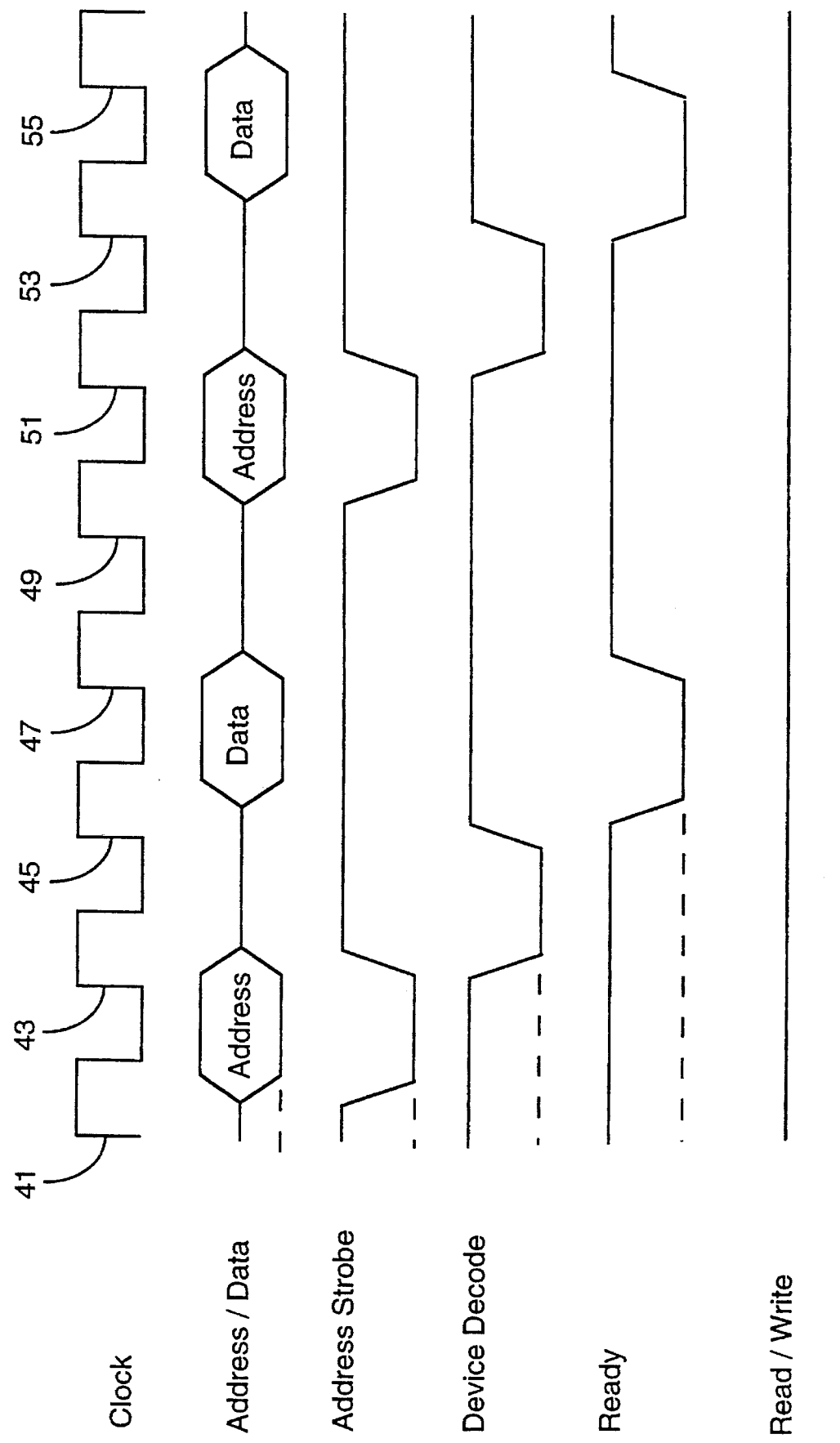
FIG. 5 is a timing diagram showing the states of the Clock, HCI Bus Address/Data, Address Strobe, Device Decode, Ready, and Read/Write lines during back-to-back read operations in an embodiment of the invention.

FIG. 5 is a timing diagram showing the states of the Clock, HCI Bus Address/Data, Address Strobe, Device Decode, Ready, and Read/Write lines during back-to-back read operations. The first read operation is initiated when Address and Byte Enable bits (BE0, BE1, A2 . . . A31 from lines 0 to 31 in FIG. 3) are enabled onto the bus after clock transition 41, simultaneously as the Address Strobe line is also enabled. These signal transitions are slightly delayed behind the clock transition that switches them (shown here as a quarter-cycle delay). The Read/Write line remains high throughout to indicate this is a read operation. The Address and Address Strobe signals remain asserted for one clock cycle and are disabled following clock transition 43. The one cycle Address Strobe indicates a single word transfer. After clock transition 43 the Device Decode line is asserted to indicate that a device is claiming the cycle. Data from the decoded address is enabled onto the bus following clock transition 45, while Ready is also enabled to indicate that valid data is on the bus. Ready and Data remain enabled for one clock cycle until they are disabled following clock transition 47. Dead cycles after clock transitions 43 and 47 prevent bus contention. An identical read cycle is initiated after clock transition 49.

Dead cycles, or wait-states, are required in the first cycle of a read, and in an address cycle following a read to prevent bus contention. Change of bus ownership also requires a wait-state to avoid contention. Other operations, such as write cycles or following cycles in a burst, do not require wait-states.

Figure 6:
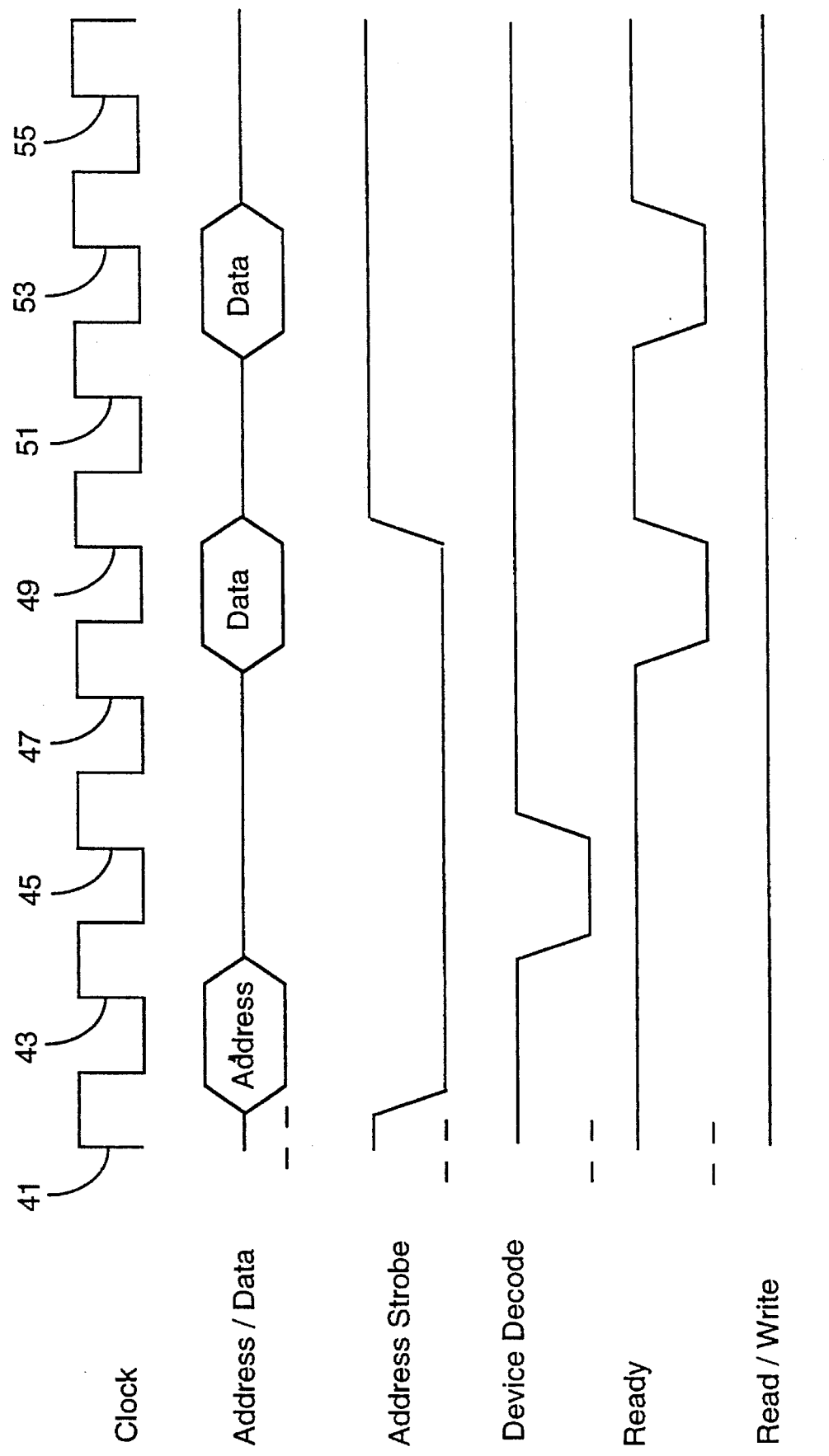
FIG. 6 is a timing diagram showing the bus states for a burst-mode read operation, also called a HCI master-mode read, in an embodiment of the present invention.

FIG. 6 is a timing diagram showing the bus states for a burst-mode read operation, also called a HCI master-mode read. A burst-mode transfer is one in which a block of data is transferred in consecutive data cycles, but the address is transmitted only once at the beginning of the operation. Elimination of address cycles between each data cycle results in substantial throughput gains for bursts of even a few data words.

For clarity, FIG. 6 shows only two data cycles in a burst transfer. The different CPUs that can be used with the HCI Bus will differ in their burst transfer characteristics. In particular, they differ in the number of data words that can be transferred in a single burst, and in the counting sequence. For example, the Intel 80486 supports bursts of up to 4 words. System controller 25 will be suitably programmed to accommodate these differences.

As shown in FIG. 6, a burst-mode read operation begins following clock transition 41 with a bus state similar to the single-word read operation shown in FIG. 5. The Address Strobe is enabled to start the Address cycle. Device Decode is enabled after the Address cycle to indicate address decoding is in progress. Unlike the single-word operation, the Address Strobe will remain enabled after the Address cycle until the ready before the last word, following clock transition 49 in this case, to maintain a burst. When data is being transferred following clock transitions 47 and 51, Ready is driven low to indicate that valid data is on the bus. Although a one clock cycle wait-state is shown between the data cycles, it is not necessary in this case. Successive data cycles in a burst can be done at zero wait-state.

Figure 7:
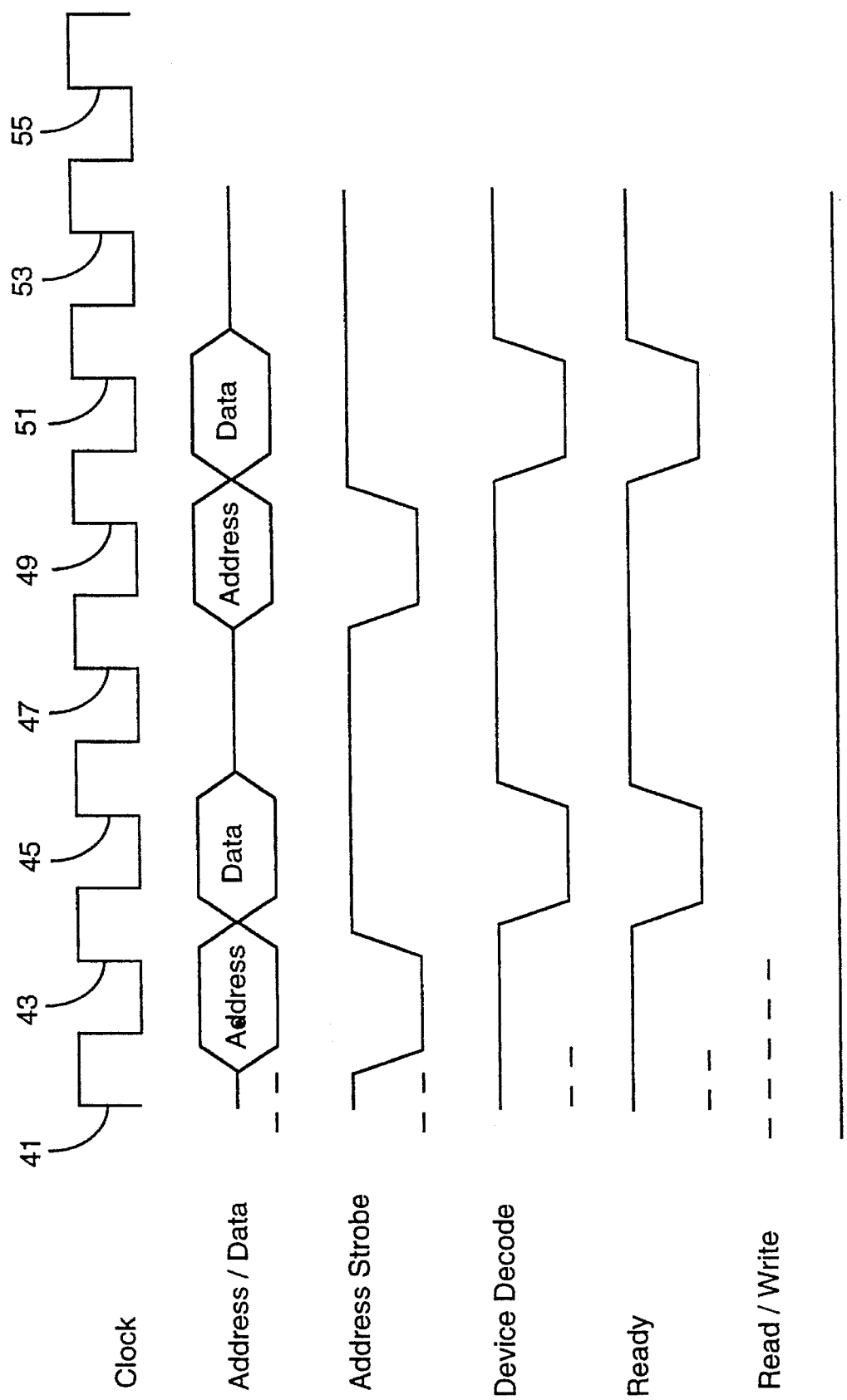
FIG. 7 is a timing diagram showing the HCI bus states for back-to-back write cycles in an embodiment of the invention.

FIG. 7 is a timing diagram showing the HCI bus states for back-to-back write cycles. As in FIG. 5, the Address Strobe is enabled for one cycle following clock transition 41, while an Address is also enabled onto the Address/Data lines. Unlike FIG. 5, the Read/Write line is enabled following clock transition 41 to signal a write operation. At the end of the address cycle, following clock transition 43, data is enabled onto the bus, while Device Decode is enabled to indicate that address decoding is in progress. Ready is driven low concurrently with the data cycle to indicate that valid data is on the bus. The write operation ends following clock transition 45, when the Address Strobe, Decode, Ready, and Read/Write lines are all returned to a high state.

Successive write operations repeat the states just described, one of which is shown following clock transition 47. A free cycle is shown between the two writes, from clock transition 45 to 47, but none is required.

Figure 8:
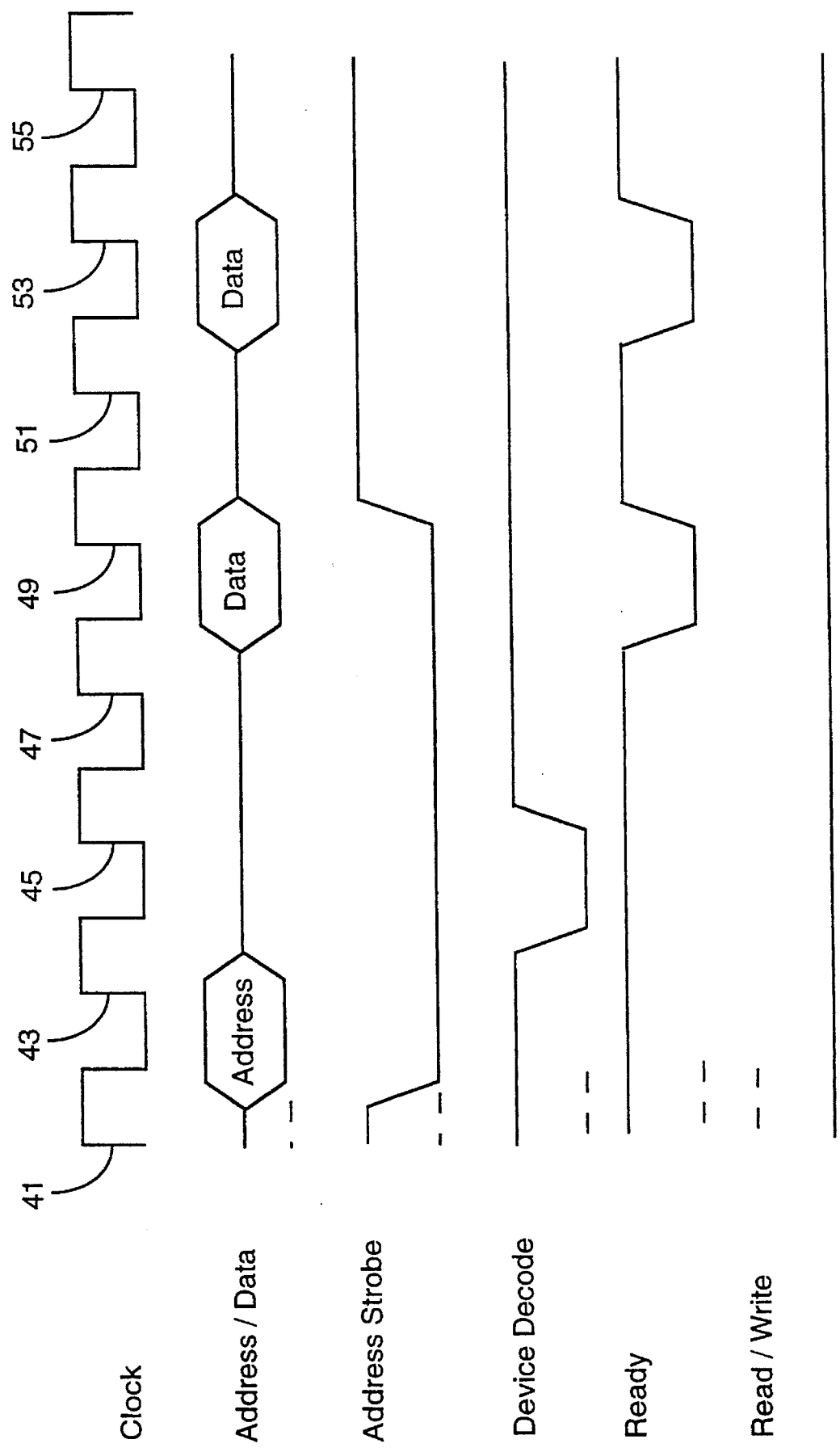
FIG. 8 is a timing diagram showing the HCI bus states for a burst-mode write transfer in an embodiment of the present invention.

FIG. 8 is a timing diagram showing the HCI bus states for a burst-mode write transfer. These states are similar to the states for a burst-mode read transfer, as shown in FIG. 6, for all lines except the Read/Write line, which is asserted following clock transition 41 to signal a write. Although wait-states are shown, they are not required. The first write data can come immediately after the address, as in FIG. 7.

A COMPRESSED BUS THROUGH A PARALLEL PORT

A compressed bus with many similarities to the HCI bus described above, is described below, and is referred to by the inventors as an Extended Enhanced Parallel Port.

General Description

One aspect of the present invention, called Extended Enhanced Parallel Port ($E^2P^2$) by the inventors, is an expansion bus interface for small computer systems. $E^2P^2$ comprises master circuitry in the host computer for interfacing to the host computer I/O bus, slave circuitry for interfacing to an external ISA expansion bus (X-ISA) and a multiplexed $E^2P^2$ bus between the two, multiplexing data, address and status information over a byte-wide pathway. Both the master and the slave circuitry interface to the $E^2P^2$ bus as well.

In some cases the X-ISA bus amounts to a single ISA compatible device connected to the slave circuitry. For example, $E^2P^2$ permits attachment of standard ISA bus I/O port devices to a host computer via a cable connection to the parallel port connector. $E^2P^2$ buffering and control circuit devices multiplex required I/O address, data and control signals over a byte-wide cable interface independently of host computer device control program steps. The cable interface, which is the $E^2P^2$ bus, is preferably a Centronics-type printer cable. $E^2P^2$ is also compatible with device control program steps and external devices intended to operate according to SPP and EPP standards.

$E^2P^2$ supports the following subset of ISA bus signals over the multiplexed intermediate bus, and synthesizes them in the external X-ISA bus:

| | | | |
|---|---|---|---|
| SD[0 . . . 15] | DACK2/ | SA[0 . . . 9] | TC |
| IOCS16/ | IRQ[5 . . . 7] | IOCHRDY | IRQ15 |
| IOR/ | RESET | IOW/ | BCLK |
| AEN | OSC | DRQ2 | ALE |

$E^2P^2$ and a Single Peripheral Device

Figure 9:
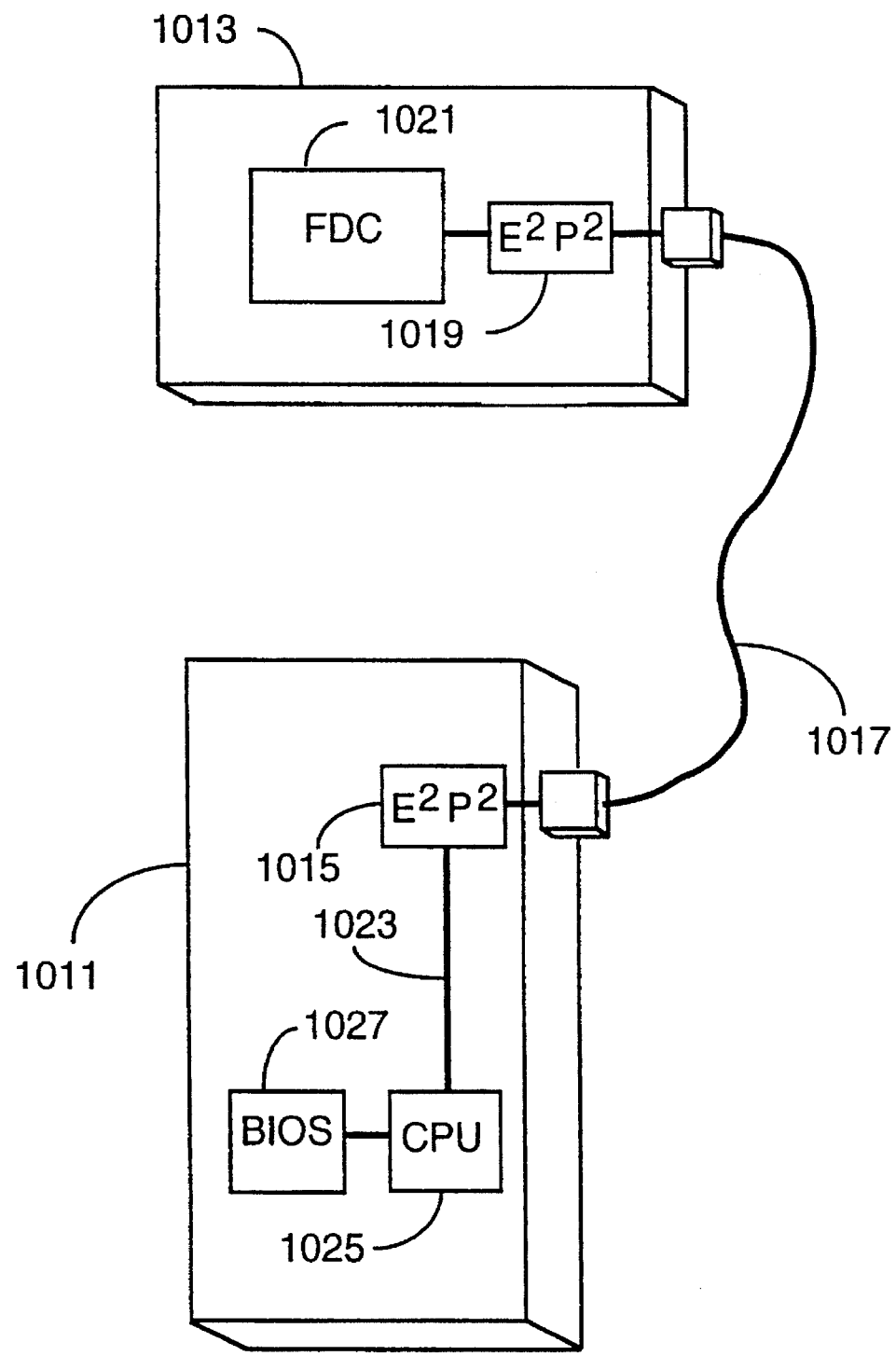
FIG. 9 is a largely schematic representation of a computer with an external disk storage device connected through a PIO port and signal cable according to the present invention.

FIG. 9 shows an embodiment of the present invention for a computer 1011 and an external floppy disk drive 1013. An $E^2P^2$ host port 1015, comprising master circuitry according to the invention, multiplexes and demultiplexes I/O address, data and control signals transmitted over a cable 1017 having 25-pin connectors and 25 conductors plus a shield, to slave circuitry 1019 of the $E^2P^2$ system. There is also provision in a preferred embodiment for transmitting power over the cable. The slave circuitry interfaces the cable bus back to ISA standard bus protocol. In a preferred embodiment the master portion of the $E^2P^2$ system is rendered as a first application specific integrated circuit (ASIC) and the slave portion is rendered as a second ASIC.

Slave circuitry 1019 comprises two state machines. One of these realizes a subset of an ISA bus state machine. The other translates between ISA bus states and $E^2P^2$ bus states. $E^2P^2$ host port 1015 has multiple operating modes, which are described below. A floppy disk controller 1021 interacts with the X-ISA bus state machine exactly as though it were connected to a host computer ISA bus, such as bus 1023. The $E^2P^2$ extended expansion system, once configured, is completely transparent to standard AT device driver software for a list of supported devices (see FIG. 17).

A physical embodiment of an X-ISA bus is optional in an embodiment such as FIG. 9. The physical implementation of the bus is generally not required where one device, such as the floppy disk device shown, is tethered to the host port. CPU 1025 executes floppy disk control program steps in a BIOS 1027 and interacts with the floppy disk exactly as it would if floppy disk controller 1021 were physically connected to the host computer ISA bus 1023. It will be apparent to one with skill in the art that other peripheral devices such as a hard disk drive or network adapter might replace the floppy disk drive and controller in alternative embodiments of a single device connected to the host port.

In $E^2P^2$ an external peripheral device according to the invention that lack a power supply can draw current at +5 volts to power the device from $E^2P^2$ host port 1015 via a conductor in cable 1017. Details of this power circuitry are described below.

$E^2P^2$ With a Docking Box

Figure 10:
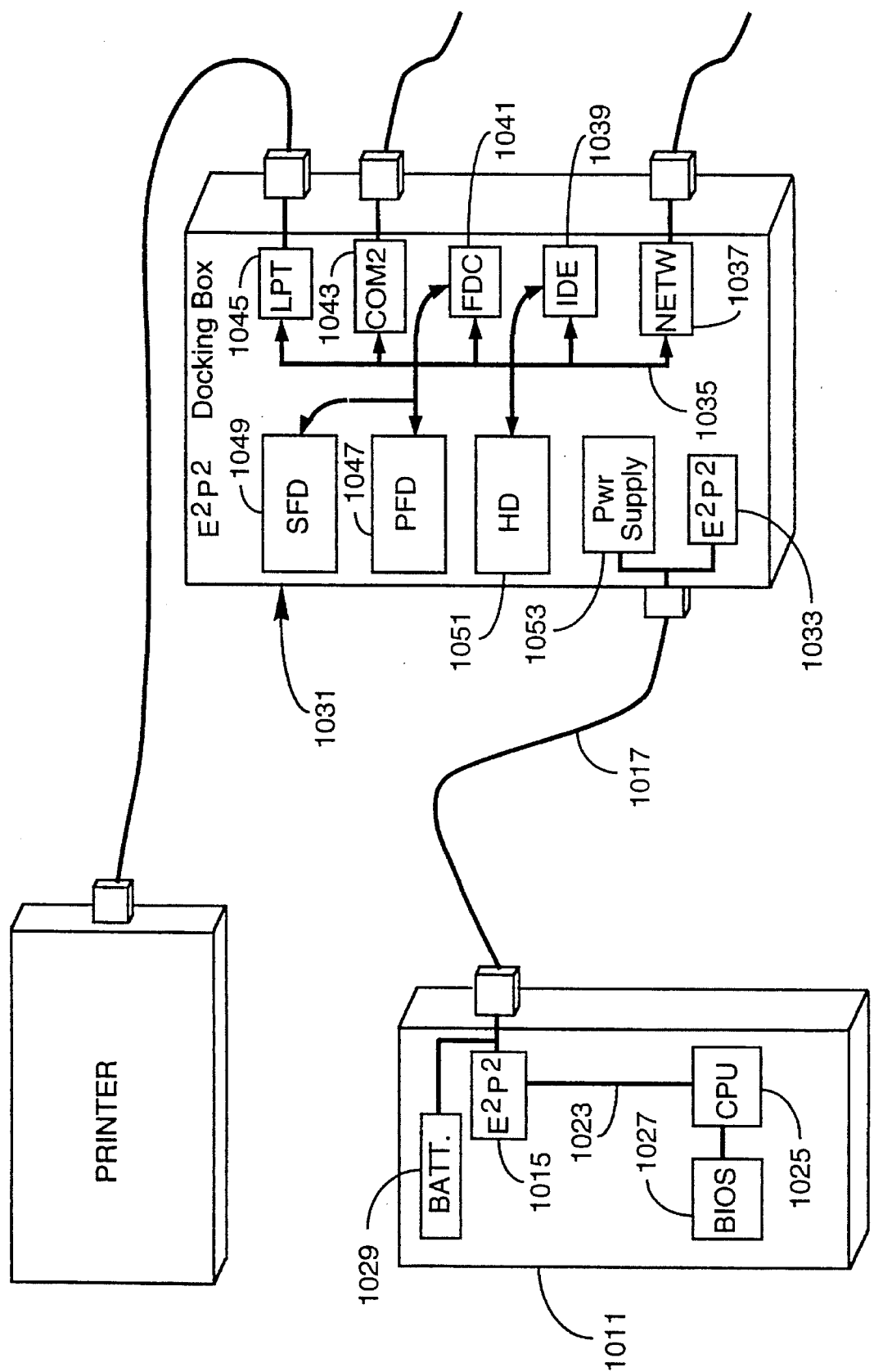
FIG. 10 is a largely schematic representation of a computer connected by a PIO port and a signal cable to a docking box according to the present invention.

FIG. 10 shows another embodiment of the present invention in which cable 1017 connects $E^2P^2$ host port 1015 of computer 1011 to a docking box 1031 comprising an X-ISA controller 1033, an X-ISA bus 1035, a network adapter 1037, an integrated device electronics (IDE) interface 1039, a floppy disk controller 1041, a serial communication port 1043, a parallel printer port 1045, a primary floppy disk drive 1047, a secondary floppy disk drive 49, a secondary hard disk drive 1051, and a power supply 1053. X-ISA controller 1033 provides a bridge between the $E^2P^2$ bus of cable 1017 and the X-ISA bus 1035. X-ISA bus 1035 is a typical ISA bus with multiple plug-in card connectors.

CPU 1025 controls the states of the peripheral devices on bus 1035 using the same program steps in BIOS 1027 that it would use if these devices were attached to ISA bus 1023. A battery 1029, which supplies power for computer 1011 when the computer is disconnected from external power sources, may receive up to 4 amperes of +12 volt charging current from power supply 1053 while operating with docking box 1031 connected via cable 1017.

Figure 11:
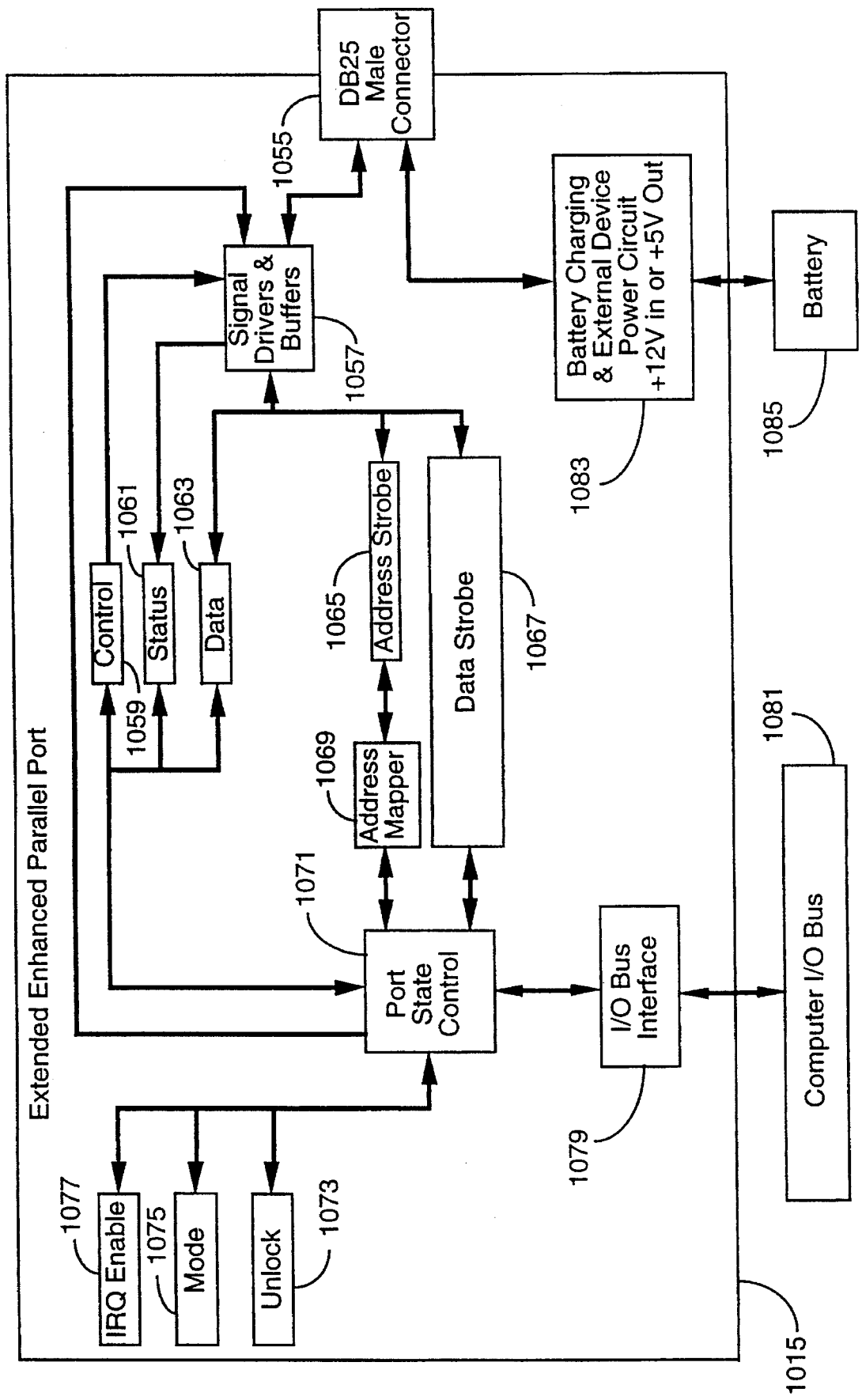
FIG. 11 is a largely schematic representation of a PIO port interface according to the present invention.

FIG. 11 illustrates an embodiment of $E^2P^2$ host port 1015 of the present invention; that is, the master portion of the $E^2P^2$. A 25-pin cable connector 1055 mates with a complementary connector on cable 1017. A set of signal line drivers and buffers 1057 interfaces cable 1017 to a Control Register 1059, a Status Register 1061, a Data Register 1063, and an Automatic Address Strobe Register 1065, all of which are 1-byte (8-bit) registers. A 4-byte Automatic Data Strobe Register 1067 is also interfaced to cable 1017 by line drivers and buffers 1057. The contents of the Automatic Data Strobe Register 1067 may be addressed by byte or word. An Address Mapper 1069 interfaces the Automatic Address Strobe Register 1065 to a State Control and Data Router 1071. The State Control and Data Router 1071 also interfaces all the other registers listed above plus an Unlock Register 1073, a Mode Register 1075 and an IRQ Enable Register 1077, which are 16-bit port-control registers, to an I/O Bus Interface 1079. I/O Bus Interface 1079 comprises bus driver and receiver devices for interfacing to a computer I/O bus 1081.

Unlock Register 1073 controls host write access to the other registers. After hardware reset the other registers are write protected. Writing the data pattern OOA5/h to the Unlock Register enables them. Writing any other value to the Unlock Register will restore write protection.

Figure 13:
FIG. 13 is a table of bit assignments for the Mode Register for the PIO port of FIG. 11.

A table of functions controlled by bits of Mode Register 1075 of FIG. 11 is shown in FIG. 13. Bits 0–2 control the operating mode of $E^2P^2$ 15. By using the binary decimal value of bits 0–3 as an indicator, up to eight operating modes are indicated as shown in FIG. 13. For example, if the decimal value of the binary representation of bits 0–3 is 3 (011), then the mode is $E^2P^2$. Bits 3–5 select the data width of network adapter ports zero and one and option port zero. Bits 6 and 7 are reserved. Bits 8–15 control ISA bus to $E^2P^2$ port address mapping and IRQ enables for the ports listed.

FIG. 14 shows a table of ISA bus IRQ levels for use by X-ISA bus port devices. These are controlled by bits 8–11 of IRQ Enable Register 1077, with bit 13 reserved for future use for IRQ4. A set bit enables the corresponding IRQ level. Bit 12 is used for Clock Off and Clock On.

Power Transfers

In $E^2P^2$ mode an external port power circuit (XPPC) 1083 connects between the +5 volt power supply of computer 1011 and pin-18 or 19 of 25-pin cable connecter 1055 that is defined as a ground pin for SPP and EPP modes, as shown in FIG. 15. XPPC 1083 supplies +5 volt power to unpowered external devices, such as external floppy disk 1013. In an embodiment of $E^2P^2$ host port 1015 for a battery powered computer, XPPC 1083 also allows X-ISA controller 1033 to supply up to 4 amperes of +12 volt charging current to battery 1085 from a power supply 1053 while the $E^2P^2$ external port 1033 is activated.

Figure 12:
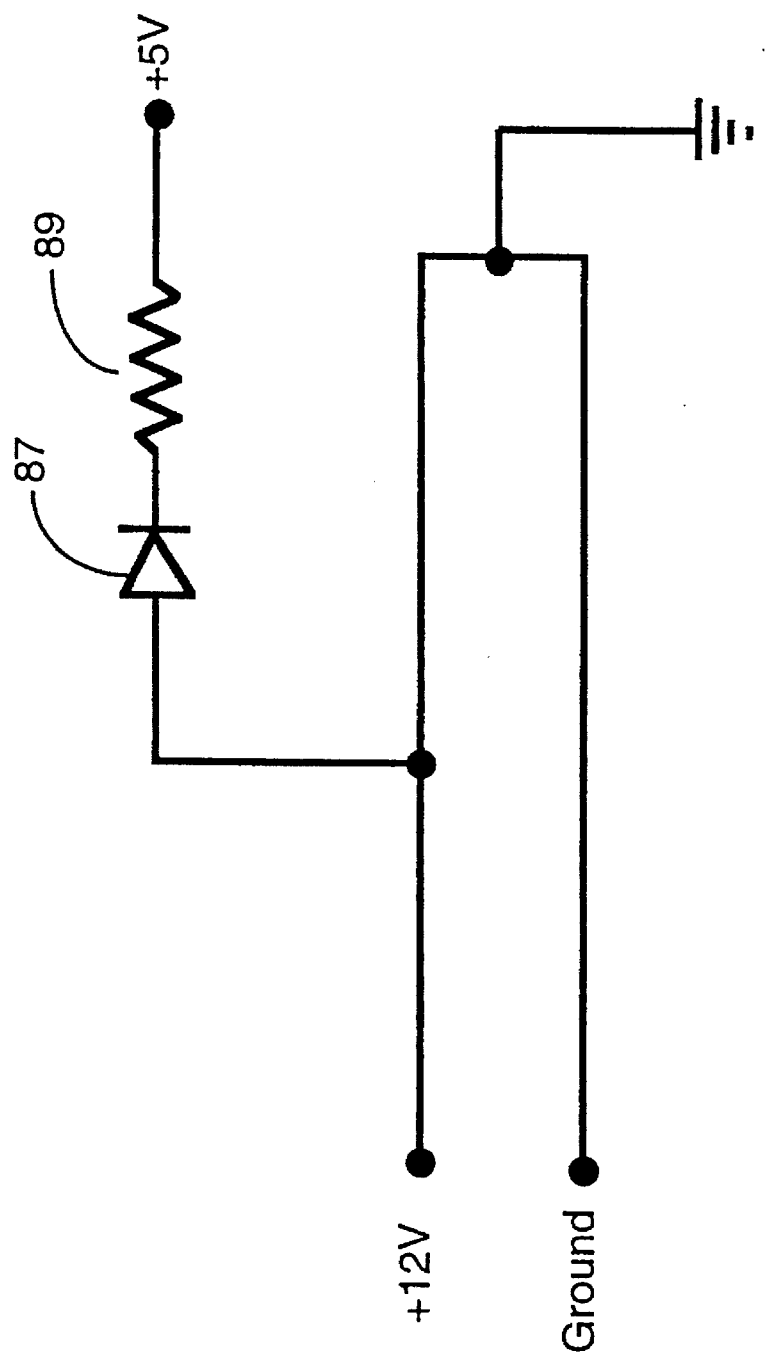
FIG. 12 is a schematic diagram showing a battery charging circuit for the PIO port of FIG. 11.

FIG. 12 shows an embodiment of XPPC 1083. A diode 1087 allows current to be drawn from the positive pole of +5 volt battery 1085 (FIG. 11), thus causing the battery to charge, when +12 volts is applied to pin-18 of cable 1055 by power supply 1053. Diode 1087 prevents a short circuit of battery 1085 by attachment of cable 1055 to an external device that grounds pin 18 of cable 1055. A resistor 1089 connected between pin 18 of cable 1055 and system ground provides a regulating load to power supply 1053.

A table showing the $E^2P^2$ bus cable connector pin to register connections and signal designations for all three modes of operation of $E^2P^2$ is shown in FIG. 15. One with skill in the art will recognize that the signal designations for SPP and EPP modes are compatible with devices built for those modes of operation.

$E^2P^2$ mode uses the data lines on pins 2–9 to multiplex external device address and data as do EPP devices, but also uses them to communicate IRQ state information. $E^2P^2$ mode allows the $E^2P^2$ bus state machine to use control and status lines, pin 1 and pins 10–16, for bus control signals of the $E^2P^2$ bus. Pins 12–15 carry $E^2P^2$ bus cycle (CY) signals. $E^2P^2$ mode switches the pins 1 and 16 line drivers from open ended to differential drive with positive drive voltage on pin 16 and negative drive voltage on pin 1. This differentially driven circuit carries the bus strobe pulse. One with skill in the art will recognize that there improved noise immunity offered by this arrangement. $E^2P^2$ mode also activates connection of XPPC 1083 to pin 18 and 19. Pins 20–25 are connected to chassis ground in all three parallel port operating modes.

$E^2P^2$ supports a subset of the ISA peripheral status lines. These are:

| IRQ[5 . . . 7] | IRQ15 | DRQ2/DACK2 |
|---|---|---|

These status lines are monitored by the slave portion of the system. Whenever there is a change in status the $E^2P^2$ signal INTR is asserted to the host $E^2P^2$ device. At the completion of the current $E^2P^2$ cycle the host $E^2P^2$ device will perform a status read cycle followed immediately by a write cycle to a Status Image Register in the slave circuitry. When the Status Image Register matches the current state of the X-ISA status lines, the slave de-asserts the INTR signal.

FIG. 15 displays the $E^2P^2$ AD cycles by type and corresponding hex value on the CY lines.

FIG. 17 is a table indicating peripheral I/O devices supported by $E^2P^2$ in the embodiments described herein. I/O device address translation mapping between 10-bit ISA bus values and 8-bit $E^2P^2$ bus values are indicated. Other embodiments might use different mappings for the same I/O devices or map a different set of I/O devices. 16-bit data values are multiplexed through the $E^2P^2$ bus as two consecutive 8-bit values. When a program step causes CPU 25 to address an I/O address in column 2 of the table and the enable bit for that device is set in Mode Register 1075, port state controller 1071 routes the I/O address bits to address mapper 1069, which performs the address translation and loads the 8-bit address value into Address Strobe Register 1065.

In FIG. 17 the following abbreviations are used:
NET=Network Device
OPT=Optional Device
SHD=Secondary Hard Disk Controller
SFDC=Secondary Floppy Disk Controller
LPT=Line Printer
PFDC=Primary Floppy Disk Controller
PHD=Primary Hard Disk Controller In operation a computer equipped with $E^2P^2$ employs a start up routine that comprises a "tickle" operation for querying the parallel port(s) to discover the nature of devices connected thereto. Typically the tickle routine is a program step or steps in the computer BIOS for sending a code to one of the pins on the parallel port. The tickle code could be a series of logical high signals in a specified period of time, or some other code.

As an operating example, an $E^2P^2$ computer with an external floppy disk connected to the parallel port would tickle the port (at a specific pin) on start up, and the External floppy would, if equipped for $E^2P^2$, answer on a "handshake" line, whereupon the start up routine would set the operating mode for $E^2P^2$. The tickle routine could similarly discover if the mode should be EPP or SPP.

DMA Prefetch

Memory devices such as disk drives using $E^2P^2$ are always remote, connected either singly over a cable of up to three meters, or in, or tethered to, a docking box communicating through a cable and $E^2P^2$ interfaces. This remote placement, as opposed to local placement for typical conventional systems, poses a memory access problem that is handled through firmware at the $E^2P^2$ host interface circuitry.

Data transfer from a floppy disk device to the host system is exemplary. In a conventional system the floppy controller is installed locally, i.e in the same frame as the host system. For every byte of data to be transferred from the floppy to the host during a floppy read operation, the floppy controller first makes a data request signal (DRQ) to the system's DMA controller. There is no indication from the floppy controller whether this is a request to read data or to write data. The DMA controller is pre-programmed by the system software to respond with either a read or a write acknowledge signal.

In the $E^2P^2$ implementation the floppy controller is remote, communicating over a cable of up to three meters in length. In this case, when the floppy controller makes a data transfer request for a read operation, the $E^2P^2$ host circuitry intercepts the request and gets the data from the floppy controller before passing the request on to the host system. This is necessary because a device making a DMA transfer request to the system is required to have the data ready for writing to system memory at the time of the request. In the case of the remote floppy communicating over the $E^2P^2$ cable some time is required to transfer the data over the cable. So the $E^2P^2$ system is configured to prefetch the floppy data before making the transfer request to the host system.

When $E^2P^2$ sees the initial DRQ signal from the floppy controller it has to have some way of knowing whether the request is to read data or to write data. Only the DMA hardware "knows" for sure, as a result of host system programming. Accordingly, the $E^2P^2$ is configured with "trap" hardware to watch for the specific host system instruction to the DMA that sets it up for servicing floppy read data requests. When this instruction is trapped, then the $E^2P^2$ system knows to respond to the next series of DRQ's as read requests and to prefetch the data from the floppy and present it to the system bus before passing on the DRQ to the system DMA controller. The inventors refer to this capability as a "premonition pipeline".

After intercepting a read setup command for DMA, $E^2P^2$ continues to interpret DRQ's from the floppy as read requests until another command that is not a read setup command to the DMA is intercepted.

Pinouts

In a preferred embodiment, as described above, the $E^2P^2$ master circuitry at the host system end is implemented as an ASIC, and the slave circuitry at the remote end of the $E^2P^2$ bus is implemented as a second ASIC. FIGS. 18 and 19 comprise a pinout listing for the host master ASIC in this embodiment, FIG. 10 listing pins 1–40, and FIG. 19 listing pins 41–80.

Relative to the master chip in this embodiment, when the chip is powered down (VCC=0 volts), all pins that are designated as having OS24/12 or OS24 outputs must be capable of sinking 22 milliamps through their ESD diode to ground. The die must be able to sink this current indefinitely on all OS24/12 and OS24 output pins simultaneously. Additionally, all output drivers have slew rate limiting with a time constant of approximately 4 nanoseconds.

In addition to the above, OS16/4 indicates a tri-state driver that can sink 16 ma and source 4 ma. OS24/12 indicates a tri-state output driver that can sink 24 ma and source 12 ma. Pins PS2 and PS3 must sink and source 24 ma.

FIG. 20 is a pinout listing for pins 1–40 of the slave ASIC, and FIG. 21 is a pinout listing for pins 41–80 of the slave ASIC. Relative to the slave chip in this embodiment, when the chip is powered down (VCC=0 volts), all pins that are designated as having OS24/12 or OS24 outputs must be capable of sinking 22 milliamps through their ESD diode to ground. The die must be able to sink this current indefinitely on all OS24/12 and OS24 output pins simultaneously. Additionally, all output drivers have slew rate limiting with a time constant of approximately 4 nanoseconds.

In addition to the above, OS16/4 indicates a tri-state driver that can sink 16 ma and source 4 ma. OS24/12 indicates a tri-state output driver that can sink 24 ma and source 12 ma. Pins PS2 and PS3 must sink and source 24 ma. Also, OB16/4 indicates an output driver that can sink 16 ma and source 4 ma.

There is one register in the slave chip, the Status Image Register, mentioned briefly above. The data in this register is driven onto the AD[7:] wires when a Read Status Image cycle is performed on the slave. This register can be written via the AD[7:0] wires when a Write Status Image command is sent to the slave from the master. This register is not directly read/writable by the host system.

It will be apparent to those with skill in the art that there are many alterations in detail that might be made without departing from the spirit and scope of the invention. Many alternatives are described above. The scope of the invention is limited only by the breadth of the claims.

What is claimed is:

1. A computer bus expansion system comprising:

an internal bus having data, address, and control lines, but no interrupt lines;

bus control circuitry coupled to the internal bus and to a central processing unit (CPU);

a first translator connected to the internal bus;

an intermediate bus of lesser width than the internal bus, and connected to the first translator;

a second translator connected to the intermediate bus; and an expansion bus having the same number of lines as and equivalent signals to the internal bus, the expansion bus connected to the second translator;

wherein interrupts are addresses unique to specific peripheral devices, the addresses are translated from address lines of the expansion bus through the second translator to the intermediate bus, and through the first translator from the intermediate bus onto address lines of the internal bus, the translations transparent to system operating code, and wherein the bus control circuitry decodes the addresses to the CPU as interrupts specific to the associated peripheral devices.

2. A computer bus expansion system as in claim 1 further comprising a peripheral device connected to the expansion bus, the peripheral device adapted for issuing an interrupt as an address specific to the peripheral device on address lines of the expansion bus.

3. A computer bus expansion system as in claim 1 wherein the intermediate bus is a Centronics™-type cable with 25-pin end connectors, and the first translator is adapted for operating as in industry-standard parallel port as well as adapted for operating as a bus translator transparent to system operating code.

4. A computer bus expansion system as in claim 1 wherein the internal and external buses are compressed buses wherein 32-bit addresses and 32-bit data are multiplexed on 32 lines.

5. A computer system comprising:

an internal bus having data, address, and control lines, but no interrupt lines;

bus control circuitry coupled to the internal bus and to a central processing unit (CPU);

system memory;

first peripheral ports connected to the internal bus and adapted for connecting peripheral devices;

a first translator connected to the internal bus;

an intermediate bus of lesser width than the internal bus, and connected to the first translator;

a second translator connected to the intermediate bus;

an expansion bus having the same number of lines as and equivalent signals to the internal bus, the expansion bus connected to the second translator; and second peripheral ports connected to the expansion bus and adapted for connecting peripheral devices;

wherein interrupts are addresses unique to specific peripheral devices connected to the peripheral ports, and wherein addresses, data, and control signals are translated between the internal bus and the expansion bus through the first and second translators and the intermediate bus transparent to system operating code, and wherein the bus control circuitry decodes the addresses to the CPU as interrupts specific to the associated peripheral devices.

6. A computer system as in claim 5 further comprising peripheral devices connected to the internal bus and the expansion bus at peripheral ports, the peripheral devices adapted for issuing interrupts as addresses specific to the peripheral devices connected to the peripheral ports.

7. A computer system as in claim 5 wherein the intermediate bus is a Centronics™-type cable with 25-pin end connectors, and the first translator is adapted for operating as in industry-standard parallel port as well as adapted for operating as a bus translator transparent to system operating code.

8. A computer system as in claim 5 wherein the internal and external buses are compressed buses wherein 32-bit addresses and 32-bit data are multiplexed on 32 lines.

9. A method for issuing an interrupt from a peripheral device coupled to a first bus external to a computer to a central processing unit (CPU) coupled to a second bus internal to the computer, wherein the first and second buses have the same number of lines and equivalent signals and each lack interrupt lines, the method comprising steps of:

(a) issuing an address on address lines of the first bus by the peripheral device, the address unique to the peripheral device;

(b) translating the address through a first translating circuit onto an intermediate bus of less width than the first and second buses;

(c) translating the address through a second translating circuit from the intermediate bus onto address lines of the second bus; and (d) decoding the address as an interrupt specific to the peripheral device at control circuitry coupled to the second bus.

10. The method of claim 9 wherein peripheral devices are connected to the internal bus and the expansion bus at peripheral ports, the peripheral devices adapted for issuing interrupts as addresses specific to the peripheral devices connected to the peripheral ports.

11. The method of claim 9 wherein the intermediate bus is a Centronics™-type cable with 25-pin end connectors, and the first translator is adapted for operating as in industry-standard parallel port as well as adapted for operating as a bus translator transparent to system operating code.

12. The method of claim 9 wherein the internal and external buses are compressed buses wherein 32-bit addresses and 32-bit data are multiplexed on 32 lines.

* * * * *